(12) United States Patent
Yue

(10) Patent No.: US 8,632,114 B2
(45) Date of Patent: Jan. 21, 2014

(54) COMPOSITE TONNEAU COVER OF PICK-UP TRUCK

(75) Inventor: Shiawdar Shaun Yue, Cupertino, CA (US)

(73) Assignee: CYC Engineering, Inc., Fremont, CA (US)

( * ) Notice: Subject to any disclaimer, the term of this patent is extended or adjusted under 35 U.S.C. 154(b) by 0 days.

(21) Appl. No.: 13/527,559

(22) Filed: Jun. 19, 2012

(65) Prior Publication Data

US 2012/0274091 A1    Nov. 1, 2012

Related U.S. Application Data

(63) Continuation-in-part of application No. 13/097,039, filed on Apr. 28, 2011.

(51) Int. Cl.
  *B60P 7/02*    (2006.01)
(52) U.S. Cl.
  USPC ................................. 296/100.02; 296/100.04
(58) Field of Classification Search
  USPC ................. 296/37.6, 100.03, 103.05, 100.05, 296/100.01, 100.07, 100.16, 100.18, 296/100.04, 100.02
  IPC .......................................................... B60P 7/02
  See application file for complete search history.

(56) References Cited

U.S. PATENT DOCUMENTS

| | | | | | |
|---|---|---|---|---|---|
| 1,718,183 | A | * | 6/1929 | Smith | 160/368.1 |
| 3,979,782 | A | * | 9/1976 | Lamb | 4/502 |
| 5,427,428 | A | * | 6/1995 | Ericson et al. | 296/98 |
| 5,472,256 | A | * | 12/1995 | Tucker | 296/100.18 |
| 6,053,557 | A | * | 4/2000 | Kooiker | 296/100.06 |
| 6,257,647 | B1 | * | 7/2001 | Ninness et al. | 296/100.15 |
| 7,823,957 | B2 | * | 11/2010 | Williamson et al. | 296/100.16 |
| 7,954,876 | B2 | * | 6/2011 | Kosinski | 296/98 |
| 2008/0129077 | A1 | | 6/2008 | Weldy | |
| 2008/0197663 | A1 | * | 8/2008 | Smith | 296/100.01 |
| 2010/0270824 | A1 | | 10/2010 | Yue | |

* cited by examiner

*Primary Examiner* — Glenn Dayoan
*Assistant Examiner* — Pinel Romain

(57) ABSTRACT

A composite tonneau cover of a pick-up truck is disclosed. The composite tonneau cover has at least one frame section and is releasably secured on a side wall of a cargo bed of the pick-up truck. Each of the frame section comprises: a flexible cover material; a rigid metal panel covered by the flexible cover material and having at least two end edges; and a plurality of outer rails covered by the flexible cover material. Each of the outer rails has an inner side formed with an installation groove, and each of the end edges of the rigid metal panel is inserted into the installation groove of one of the outer rails. Thus, the composite tonneau cover can provide dual advantages of hard-top type tonneau cover and soft-top type tonneau cover.

19 Claims, 13 Drawing Sheets

COMPOSITE TONNEAU COVER OF PICK-UP TRUCK

CROSS REFERENCE TO RELATED APPLICATIONS

This application is a continuation in part application of U.S. patent application Ser. No. 13/097,039, filed on Apr. 28, 2011, the disclosure of which is incorporated herein by reference.

FIELD OF THE INVENTION

The present invention relates to a composite tonneau cover of a pick-up truck, and more particularly to a composite tonneau cover of a pick-up truck having a flexible cover material, a rigid metal panel and a plurality of one-piece outer rails.

BACKGROUND OF THE INVENTION

A pick-up truck has a cargo bed used to carry various cargos. Generally, the cargo bed is covered by a tonneau cover which is releasably clamped to and extended above the cargo bed, so as to protect the carried cargos from adverse weather and improve the aesthetic appearance of the pick-up truck. The tonneau covers can be classified into hard-top type and soft-top type, wherein the hard-top type tonneau cover has a hard top made of metal, fiberglass or the like, while the soft-top type tonneau cover has a soft top made of canvas, vinyl plastic or a weather-resistant fabric.

In general, although the hard-top tonneau cover provides greater security for cargo and can be more easily clamped on the cargo bed of the pick-up truck, it is heavier than the soft-top tonneau cover, and it needs more storage space for storing the hard-top tonneau cover after being removed from the pick-up truck. Furthermore, the soft-top tonneau cover is lighter in weight, and the volume thereof is more compact for storage. Meanwhile, both of the hard-top tonneau cover and the soft-top tonneau cover need to provide clamps for securely clamping the tonneau cover to the pick-up truck.

For example, referring now to FIG. 1, US Patent Application Publication No. 2010-0270824 discloses a clamp structure for a tonneau cover 91, mounted to one of at least two frame sections 92 of the tonneau cover 91 for releasably securing the frame sections 92 on a side wall 93 of a cargo bed of a pick-up truck, the clamp comprises: a foundation rail 94 connected to one of the frame sections 92, and having two side grooves 941 formed on two side surfaces of the foundation rail 92, and a recess 942 formed between the two side grooves 941; a sliding block 95 having two side hangers 951 extended into the two side grooves 941 and slidably moving along the two side grooves 941, and a pivotal portion 952 received in the recess 942; a clamp bolt 96 having a first pivotal end 961 pivotally connected to the pivotal portion 952 of the sliding block 95, and a second pivotal section 962; a grip element 97 movably mounted on the clamp bolt 96 and having an engaging portion 971; and a handle 98 pivotally connected to the second pivotal section 962 of the clamp bolt 96 and having a cam surface 981 to abut against the grip element 97, so as to control the engaging portion 971 of the grip element 97 to engage with a surface of the side wall 93 of the pick-up truck.

In this traditional clamp structure, the grip element 97 is generally made of metal, engineering plastic or other equivalent rigid material. However, when the grip element 97 is only made of metal which is rigid without elastically deformable property, it is relatively difficult for the cam surface 981 of the handle 98 to smoothly abut against the grip element 97. Meanwhile, because the engaging portion 971 of the grip element 97 engages with the surface of the side wall 93 too tightly, there will be a risk of damaging the surface of the side wall 93. After long-term use, the cam surface 981, the grip element 97 and/or the surface of the side wall 93 may thus deform or be damaged, so as to increase the installation distance between the cam surface 981 and the grip element 97 or the engagement distance between the grip element 97 and the side wall 93, resulting in a loose or invalid clamping relationship thereof.

On the other hand, when the grip element 97 is only made of engineering plastic which has a certain elastically deformable property, the cam surface 981 of the handle 98 may abut against a pair of sliding grooves of the grip element 97 too tightly, so that the cam surface 981 of the handle 98 may accidentally depart from the sliding grooves (unlabeled) of the grip element 97. Meanwhile, because it has no sufficient structural strength for the engaging portion 971 of the grip element 97 to stably engage with the surface of the side wall 93, there will be a risk of damaging the engaging portion 971 of the grip element 97. After long-term use, the cam surface 981, the grip element 97 and/or the surface of the side wall 93 may thus deform or be damaged, so as to increase the installation/engagement distance and cause a loose or invalid clamping relationship.

Furthermore, referring now to FIG. 1A, US Patent Application Publication No. 2008-0129077 discloses a pick-up truck tonneau cover which comprises: a peripheral frame 81, a flexible cover 82, at least one rigid plastic panel 83 and at least one bow 84. The peripheral frame 81 is substantially similar to the frame section 92 as shown in FIG. 1, and formed by aluminum extrusion. An inner side of the peripheral frame 81 is further provided with a C-shape first insertion groove 811 and a C-shape second insertion groove 812 parallel to the first insertion groove 811, wherein a plastic support member 813 has two extension portions (unlabeled) extended into the first and second insertion grooves 811, 812, so that the plastic support member 813 is mounted and positioned on the inner side of the peripheral frame 81. A top surface of the plastic support member 813 is used as a support step 814 to support one end edge of the rigid plastic panel 83 which is made of reinforced plastic plate. The flexible cover 82 is covered on the peripheral frame 81 and the rigid plastic panel 83. An inner surface of an end edge of the flexible cover 82 is provided with an insertion strip 821 which is inserted into a C-shape engagement groove 815 of the peripheral frame 81. The bow 84 is suitably connected to the peripheral frame 81 by screws or welding, and spanning an interior space defined by the peripheral frame 81 under the flexible cover 82 and the rigid plastic panel 83.

In this traditional tonneau cover, the flexible cover 82 and the rigid plastic panel 83 commonly construct a composite cover structure to provide dual advantages of hard-top type tonneau cover and soft-top type tonneau cover. However, the rigid plastic panel 83 is made of reinforced/laminated plastic plate which considerably increases the entire thickness and weight of the composite cover structure and relatively lowers the heat dissipation efficiency thereof. In addition, the end edge of the rigid plastic panel 83 is simply placed on the support step 814 of the plastic support member 813 without any structure to increase installation reliability. Furthermore, the plastic support member 813 is mounted and positioned on the inner side of the peripheral frame 81. When an external impact is applied onto the flexible cover 82 and transferred to the rigid plastic panel 83, the external impact may indirectly affect and release the engagement relationship between the two extension portions of the plastic support member 813 and the two insertion grooves 811, 812. Thus, the plastic support member 813 may separate from the peripheral frame 81, and even the external impact may cause the crack of the rigid plastic panel 83. Besides, the combination design of the plastic support member 813 and the peripheral frame 81 relatively complicates the frame structure and increases the installation/material cost.

As a result, it is important for related designers and manufacturers to think how to develop a cover assembly for a tonneau cover of a pick-up truck and a composite tonneau cover, in order to solve the problems existing in the conventional clamps, as described above.

SUMMARY OF THE INVENTION

A primary object of the present invention is to provide a clamp structure for a tonneau cover of a pick-up truck, wherein the clamp structure has a composite grip element which comprises a metal grip body and a plastic sleeve, the metal grip body has an engaging portion to stably engage with a surface of a side wall of the pick-up truck, and the plastic sleeve has a first abutment flange to smoothly abut against a turning handle and a second abutment end facing a sliding block. Thus, the composite grip element can provide advantages of both of metal and plastic material, so that the operational stability and reliability of the clamp structure can be enhanced, and the lifetime thereof can be elongated.

A secondary object of the present invention is to provide a clamp structure for a tonneau cover of a pick-up truck, wherein a second abutment end of the plastic sleeve of the composite grip element has a width greater than that of a notch of the sliding block, and thus the second abutment end of the plastic sleeve smoothly slides along a surface edge of the notch of the sliding block, so as to prevent the metal surface of the metal grip body from being directly in contact with the surface of the sliding block to cause harsh noise or surface abrasion.

A third object of the present invention is to provide a clamp structure for a tonneau cover of a pick-up truck, wherein a hollow portion of the metal grip body is transversely formed in the metal grip body and communicated with an installation hole of the metal grip body, and the plastic sleeve actually passes through the installation hole and the hollow portion, wherein the hollow portion provides a certain slightly elastically deformable property to the metal grip body, so as to prevent from generating excess engagement force toward the side wall of the pick-up truck to avoid the abrasion of the side wall and the engaging portion.

A fourth object of the present invention is to provide a clamp structure for a tonneau cover of a pick-up truck, wherein the composite grip element can be easily replaced by another backup composite grip element having a backup metal grip body with a different specification, so that the clamp structure can be rapidly changed and applied to a side wall of another pick-up truck with the different specification. Thus, the application flexibility of the clamp structure can be expanded.

A fifth object of the present invention is to provide a clamp structure for a tonneau cover of a pick-up truck, wherein a foundation rail has a T-shape insertion block to be movably inserted into an insertion groove of an outer rail of a frame section, and a recess of the foundation rail has an inclined depression close to the T-shape insertion block, wherein a screw is received in the inclined depression and passes through the T-shape insertion block to screw-connect to an inner surface of the insertion groove of the frame section, so that a quick installation can be carried out.

A sixth object of the present invention is to provide a composite tonneau cover of a pick-up truck, wherein the composite tonneau cover has at least one frame section, and each of the frame section comprises a flexible cover material, a rigid metal panel and a plurality of one-piece outer rails, the flexible cover material is covered on the rigid metal panel and the outer rails, each of the outer rails is formed with an installation groove, and each of at least two end edges of the rigid metal panel are inserted into the installation groove of the outer rail. Thus, the composite tonneau cover can provide dual advantages of hard-top type tonneau cover and soft-top type tonneau cover. In addition, the entire thickness and weight of the tonneau cover can be reduced; the heat dissipation efficiency thereof can be enhanced; the installation reliability of the rigid panel can be increased; the crack risk of the rigid panel can be lowered; the structure of the outer rails can be simplified; the material cost can be lowered; the installation convenience can be improved.

To achieve the above object, one embodiment of the present invention provides a clamp structure for a tonneau cover of a pick-up truck, which is mounted to one of at least two frame sections of the tonneau cover, wherein the clamp is used to releasably secure the frame sections on a side wall of a cargo bed of the pick-up truck, wherein the clamp structure comprises:

a foundation rail connected to one of the frame sections, and having two side grooves formed on two side surfaces of the foundation rail, and a recess formed between the two side grooves;

a sliding block having two side hangers extended into the two side grooves and slidably moving along the two side grooves, and a pivotal portion received in the recess;

a clamp bolt having a pivotal end pivotally connected to the pivotal portion of the sliding block, and a thread end;

a composite grip element movably mounted on the clamp bolt, and having a metal grip body which is formed with an engaging portion and an installation hole and a plastic sleeve which passes through the installation hole of the metal grip body and is formed with a first abutment flange and a second abutment end facing the sliding block; and a turning handle rotatably and movably connected to the thread end of the clamp bolt, and having a push surface to smoothly abut against the first abutment flange of the plastic sleeve of the composite grip element, so as to control the engaging portion of the composite grip element to stably engage with the side wall of the pick-up truck.

In one embodiment of the present invention, the sliding block further comprises a notch which is extended from a lower surface of the sliding block to one side surface thereof, and the clamp bolt can be shifted into the notch to move to a storage position.

In one embodiment of the present invention, the second abutment end of the plastic sleeve of the composite grip element has a width greater than that of the notch of the sliding block, and thus the second abutment end of the plastic sleeve smoothly slides along a surface edge of the notch of the sliding block.

In one embodiment of the present invention, one of the side surfaces of the foundation rail further comprises an indentation which is communicated with the recess, and the clamp bolt can be shifted into the indentation to move to the storage position.

In one embodiment of the present invention, the notch of the sliding block is aligned with the indentation of the foundation rail when the clamp structure is in the storage position;

and the pivotal portion of the sliding block is received in the recess of the foundation rail without contacting an inner surface of the recess.

In one embodiment of the present invention, the metal grip body has a hollow portion transversely communicated with the installation hole, and the plastic sleeve passes through the installation hole and the hollow portion.

In one embodiment of the present invention, the composite grip element has a backup metal grip body having an engaging portion with a size different from that of the engaging portion of the metal grip body, and the metal grip body can be replaced by the backup metal grip body.

In one embodiment of the present invention, the foundation rail is connected to an outer rail of one of the frame sections and has a T-shape insertion block to be movably inserted into an insertion groove of the outer rail; and the recess of the foundation rail has an inclined depression close to the T-shape insertion block, wherein a screw is received in the inclined depression and passes through the T-shape insertion block to screw-connect to an inner surface of the insertion groove of the outer rail.

Furthermore, another embodiment of the present invention provides a clamp structure for a tonneau cover of a pick-up truck, which is mounted to a single frame section of the tonneau cover, wherein the clamp is used to releasably secure the frame section on a side wall of a cargo bed of the pick-up truck, wherein the clamp comprises:

a foundation rail connected to the frame section, and having two side grooves formed on two side surfaces of the foundation rail, and a recess formed between the two side grooves;

a sliding block having two side hangers extended into the two side grooves and slidably moving along the two side grooves, and a pivotal portion received in the recess;

a clamp bolt having a pivotal end pivotally connected to the pivotal portion of the sliding block, and a thread end;

a composite grip element movably mounted on the clamp bolt, and having a metal grip body which is formed with an engaging portion and an installation hole and a plastic sleeve which passes through the installation hole of the metal grip body and is formed with a first abutment flange and a second abutment end facing on the sliding block; and a turning handle rotatably and movably connected to the thread end of the clamp bolt, and having a push surface to smoothly abut against the first abutment flange of the plastic sleeve of the composite grip element, so as to control the engaging portion of the metal grip body of the composite grip element to stably engage with the side wall of the pick-up truck.

Moreover, further another embodiment of the present invention provides a composite tonneau cover of a pick-up truck, which has at least one frame section and is releasably secured on a side wall of a cargo bed of the pick-up truck, wherein each of the frame section comprises:

a flexible cover material;

a rigid metal panel covered by the flexible cover material and having at least two end edges; and a plurality of outer rails covered by the flexible cover material, and each of the outer rails having an inner side formed with an installation groove;

wherein each of the end edges of the rigid metal panel is inserted into the installation groove of one of the outer rails.

In one embodiment of the present invention, the rigid metal panel is sandwiched between the flexible cover material and the inner rail.

In one embodiment of the present invention, the rigid metal panel is made of rigid metal with suitable deformable property, such as an aluminum plate.

In one embodiment of the present invention, the end edge of the rigid metal panel is screw-connected to the installation groove of the outer rail by screw members.

In one embodiment of the present invention, the installation groove of the outer rail has an opening portion and an inner portion, and the height of the opening portion is slightly smaller than that of the inner portion.

In one embodiment of the present invention, the height of the opening portion is slightly smaller than the thickness of the rigid metal panel, and the height of the inner portion is slightly greater than the thickness of the rigid metal panel, so that the end edge of the rigid metal panel is engaged with the opening portion and inserted into the inner portion of the installation groove.

In one embodiment of the present invention, the installation groove of the outer rail has an opening portion and an inner portion, and the height of the opening portion and the inner portion is slightly greater than the thickness of the rigid metal panel, wherein the opening portion is deformed to engage with the end edge of the rigid metal panel after the end edge of the rigid metal panel is inserted into the inner portion of the installation groove.

In one embodiment of the present invention, the inner side of the outer rail is formed with a C-shape insertion groove under the installation groove.

In one embodiment of the present invention, the frame section has two or three of the outer rails and at least one inner rail, wherein the outer rails define an outline of the frame section, and the inner rail spans in an interior defined by of the outer rails.

In one embodiment of the present invention, each of two ends of the inner rail has a T-shape insertion block to be movably inserted into the insertion groove of the outer rail.

In one embodiment of the present invention, the flexible cover material is made of weather-resistant fabric, the flexible cover material has two or three end edges, and each of end edges of the flexible cover material is formed with an insertion strip made of rubber.

In one embodiment of the present invention, the outer rail has an outer side formed with a C-shape engagement groove, and the insertion strip of the flexible cover material is inserted into the engagement groove of the outer rail.

In one embodiment of the present invention, the frame section is provided with a clamp which is used to releasably secure the frame section on the side wall of the cargo bed of the pick-up truck, wherein the clamp comprises:

a foundation rail connected to the frame section, and having two side grooves formed on two side surfaces of the foundation rail, and a recess formed between the two side grooves;

a sliding block having two side hangers extended into the two side grooves and slidably moving along the two side grooves, and a pivotal portion received in the recess;

a clamp bolt having a pivotal end pivotally connected to the pivotal portion of the sliding block, and a thread end;

a composite grip element movably mounted on the clamp bolt, and having a metal grip body which is formed with an engaging portion and an installation hole and a plastic sleeve which passes through the installation hole of the metal grip body and is formed with a first abutment flange and a second abutment end facing on the sliding block; and a turning handle rotatably and movably connected to the thread end of the clamp bolt, and having a push surface to smoothly abut against the first abutment flange of the plastic sleeve of the composite grip element, so as to control the engaging portion of the metal grip body of the composite grip element to stably engage with the side wall of the pick-up truck.

DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 2:
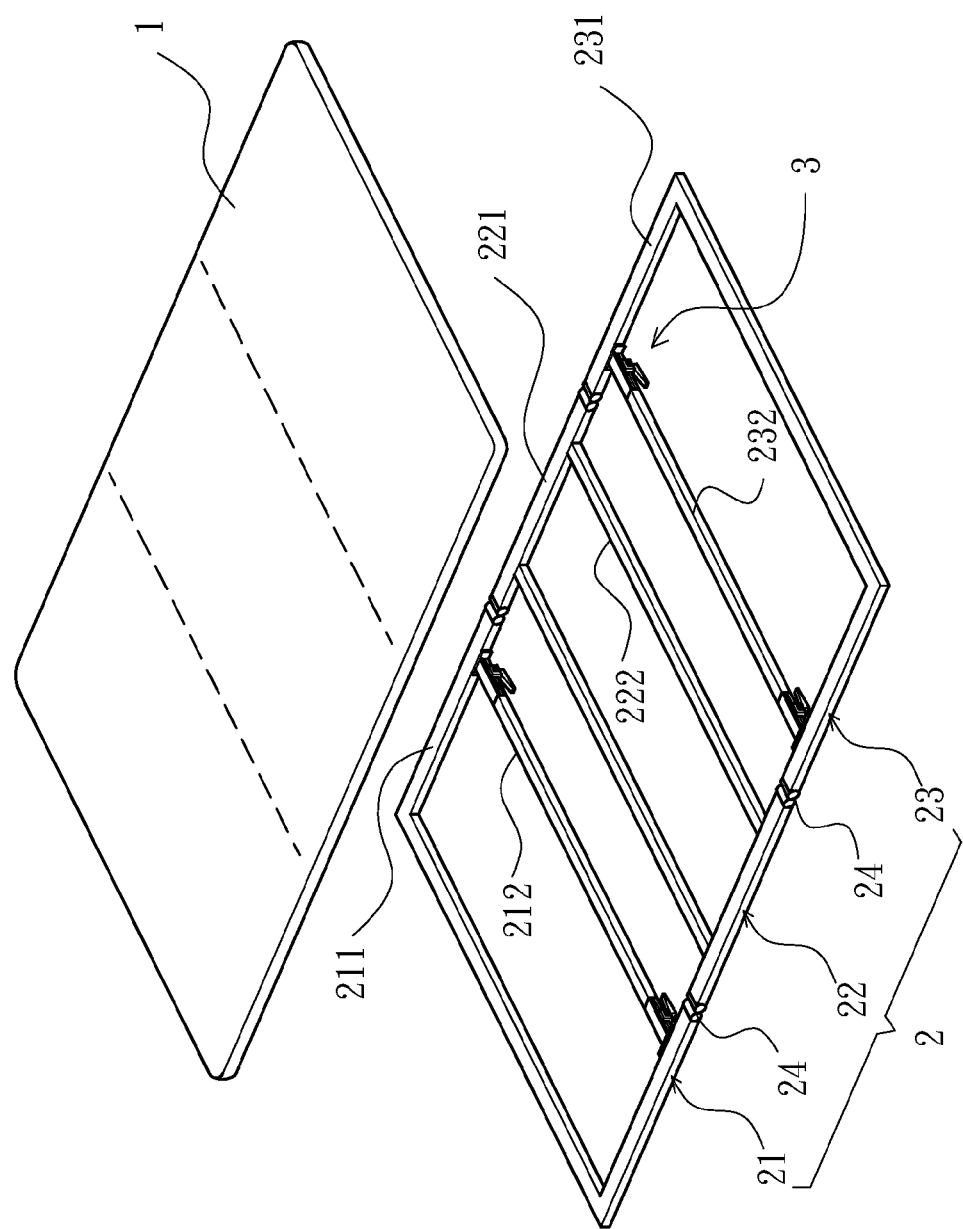
FIG. 2 is an exploded perspective view of a tonneau cover of a pick-up truck according to a first embodiment of the present invention.
Figure 3:
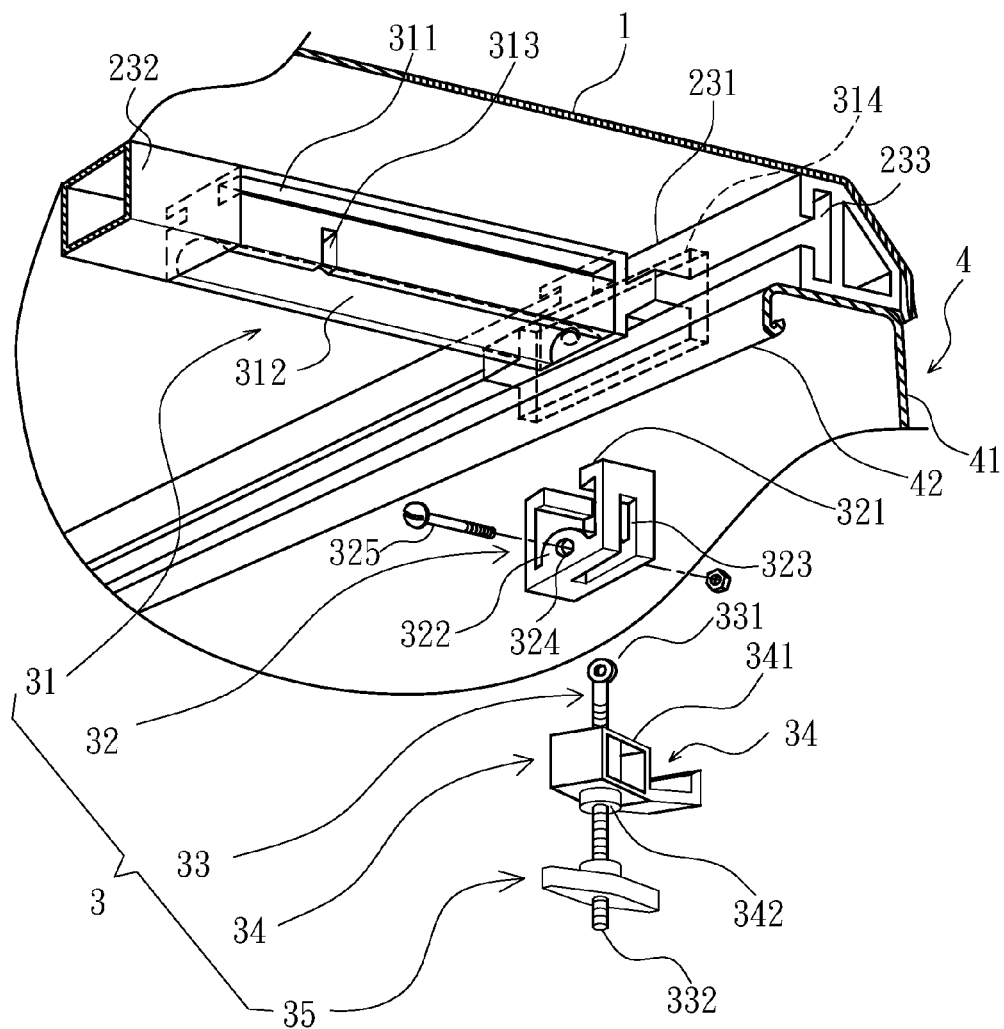
FIG. 3 is a partially enlarged view of a clamp structure for the tonneau cover according to the first embodiment of the present invention.
Figure 4:
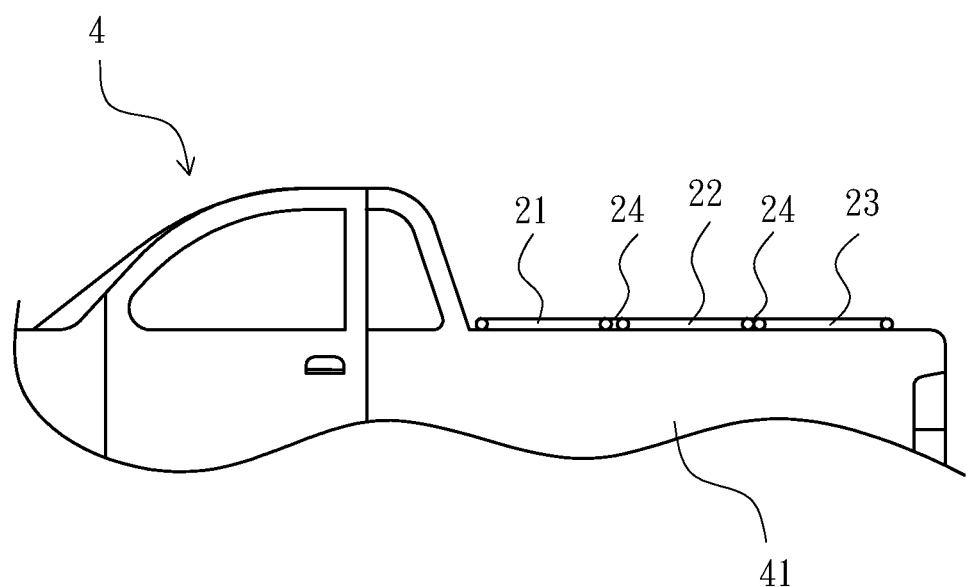
FIG. 4 is a schematic view of the tonneau cover in an extended position according to the first embodiment of the present invention.

Referring now to FIGS. 2 and 3, a tonneau cover and a clamp structure therefor according to a first embodiment of the present invention are illustrated. As shown, the tonneau cover comprises a flexible cover material 1, a foldable frame 2 and at least one clamp structure 3. The tonneau cover is used to cover a cargo bed of a pick-up truck 4, as shown in FIG. 4, and releasably clamped to a flange surface 42 of at least one side wall 41 of the cargo bed by the clamp structure 3, so as to protect cargos carried in the cargo bed of the pick-up truck from adverse weather and improve the aesthetic appearance of the pick-up truck.

Referring to FIGS. 2 and 3, in the first embodiment of the present invention, the flexible cover material 1 is made of flexible material, such as canvas, vinyl plastic, a weather-resistant fabric or other equivalent flexible material, but not limited thereto. The flexible cover material 1 is suitable fixed on the foldable frame 2, and can be simultaneously folded when the foldable frame 2 is folded. The foldable frame 2 includes at least two frame sections and at least two hinges. For example, in the embodiment, the foldable frame 2 includes a first frame section 21, a second frame section 22, a third frame section 23 and two pairs of hinges 24. However, in other embodiment, the amount of the frame sections can be two, four or more than four, while the amount of the hinge can be varied according to the amount of the frame sections. The first frame section 21 mainly has a plurality of outer rails 211 and at least one inner rail 212, wherein the outer rails 211 define the outline of the first frame section 21, and the inner rail 212 is extended from left to right of the outer rails 211 to increase the supporting strength of the first frame section 21. Similarly, the second frame section 22 has a plurality of outer rails 221 and at least one inner rail 222, while the third frame section 22 has a plurality of outer rails 231 and at least one inner rail 232. All of the outer rails 211, 221, 231 and the inner rails 212, 222, 232 are selected from various rails made of metal (such as steel, stainless steel, copper, aluminum, equivalent rigid metal or alloy thereof), engineering plastic or even wood. Especially, all of the outer rails 211, 221, 231 and the inner rails 212, 222, 232 are formed by aluminum extrusion. Meanwhile, the cross-sectional shape thereof is preferably square, rectangular, circular or polygonal, without limitation. Furthermore, the outer rails 211, 221, 231 and the inner rails 212, 222, 232 can be installed in a detachable way or in an un-detachable way according to actual needs of the tonneau cover. Furthermore, it should be noted that the foldable frame 2 of the present invention may optionally include a single frame section, while the cover material 1 can be flexible or rigid in an alternative embodiment (not shown).

Figure 3A:
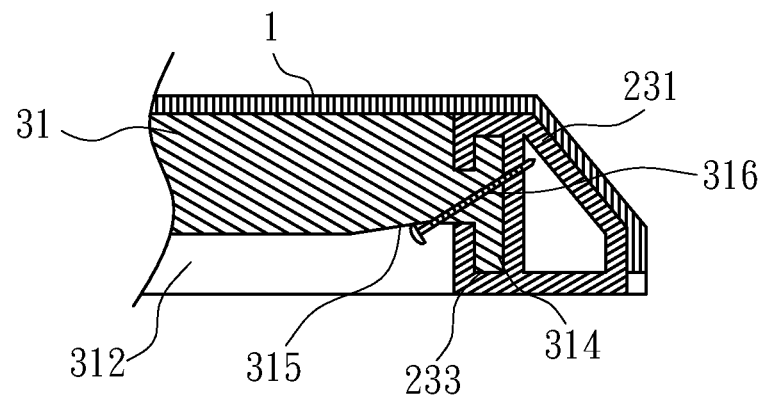
FIG. 3A is an exploded cross-sectional view of a foundation rail mounted on an outer rail in FIG. 3.

Referring now to FIGS. 2, 3 and 3A, in the first embodiment of the present invention, the clamp structure 3 can be optionally installed on at least one of the inner rails 212, 222, 232 and the outer rails 211, 221, 231. The clamp structure 3 comprises: a foundation rail 31, a sliding block 32, a clamp bolt 33, a composite grip element 34 and a turning handle 35. The foundation rail 31 has two side grooves 311 formed on two side surfaces of the foundation rail 31, and a recess 312 formed between the two side grooves 311. Each of the side grooves 311 is a dovetailed groove extended along each of the side surfaces of the foundation rail 31, having a narrow opening which will be described more detailed hereinafter. The recess 312 is formed on a lower surface of the foundation rail 31 between the two side surfaces, while the shape of the recess 312 is preferably semi-circular, curved, square, rectangular, or polygonal, without limitation. In addition, one of the side surfaces of the foundation rail 31 further comprises an indentation 313 which is communicated with the recess 312, and the clamp bolt 33 can be shifted into the indentation 313 to move to a storage position.

In the embodiment, the foundation rail 31 is a portion made of metal, engineering plastic or other equivalent rigid material and used to connect to a rail of one of the frame sections 21, 22, 23. For example, the foundation rail 31 is connected to the inner rail 232 of the third frame section 23 by means of welding, screw-connecting, inserting, engaging, or other possible connection method. Meanwhile, as shown in FIG. 3A, the foundation rail 31 has a T-shape insertion block 314 to be movably inserted into an insertion groove 233 of the outer rail 231 of the third frame section 23, and the recess 312 of the foundation rail 31 has an inclined depression 315 close to the T-shape insertion block 314, wherein a screw 316 is received in the inclined depression 315 and passes through the T-shape insertion block 314 to screw-connect to an inner surface of the insertion groove 233 of the third frame section 23, so that a quick installation can be carried out. In another embodiment, one end of the foundation rail 31 may be independently connected to the outer rail 231 of the third frame section 23, while the other end thereof will not be connected to the inner rail 232 (not-shown) but has a barrier block (not-shown) to limit the sliding of the sliding block 32. Alternatively, the foundation rail 31 also can be connected to the rearmost outer rail 231 of the third frame section 23 (or the frontmost outer rail 211 of the first frame section 21).

Figure 7:
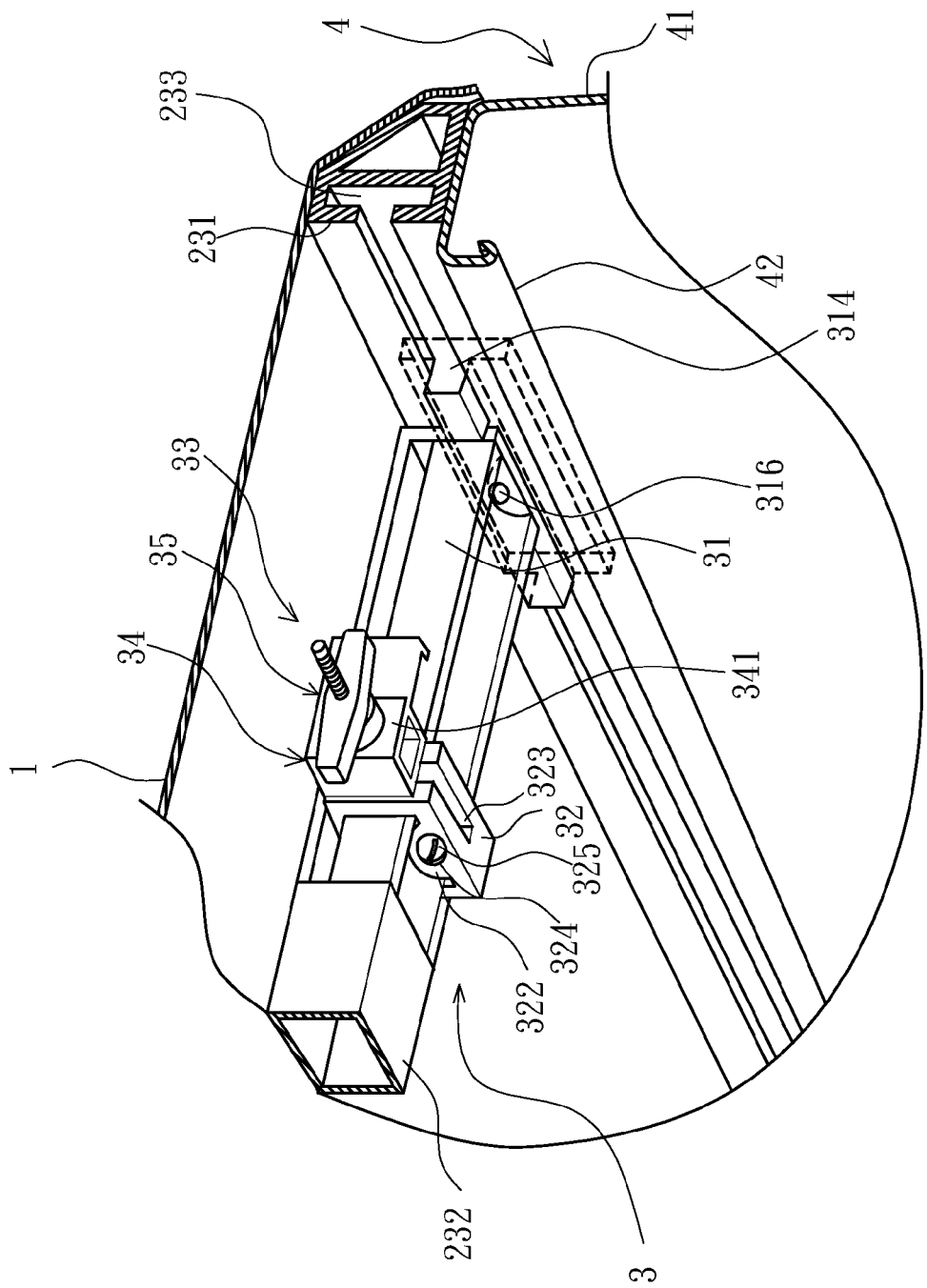
FIG. 7 is a perspective view of the clamp structure in a storage position according to the first embodiment of the present invention.

Referring still to FIG. 3, in the first embodiment of the present invention, the sliding block 32 is made of metal, engineering plastic or other equivalent rigid material, and has two side hangers 321 and a pivotal portion 322. The two side hangers 321 are formed on two opposite sides of the sliding block 32 and facing each other. Each of the two side hangers 321 is a dovetailed portion having an enlarged distal end, wherein the dovetailed shape of the side hangers 321 is corresponding to that of the side grooves 311, so that each of the two side hangers 321 can be extended into each of the two side grooves 311 and slidably move along the two side grooves 311 without departing from the side grooves 311. The pivotal portion 322 is an inner protrusion having a shape substantially corresponding to that of the recess 312 and having a size slight smaller than that of the recess 312. Thus, when the sliding block 32 is installed on the foundation rail 31, the pivotal portion 322 of the sliding block 32 can be received in the recess 312 of the foundation rail 31 without contacting an inner surface of the recess 312. In addition, the sliding block 32 further comprises a notch 323 which is extended from a lower surface of the sliding block 32 to one side surface thereof, a stepped through hole 324 passed through the pivotal portion 322 and communicated with the notch 323, and a pivotal element 325 extended through the stepped through hole 324 to pivotally connect the clamp bolt 33 to the pivotal portion 322, wherein the pivotal element 325 can include a screw and a nut. When the clamp structure is in the storage position, the notch 323 of the sliding block 32 is aligned with the indentation 313 of the foundation rail 31, so that the clamp bolt 33 can be shifted into the notch 323 and the indentation 313 to move to its storage position, as shown in FIG. 7.

Figure 3B:
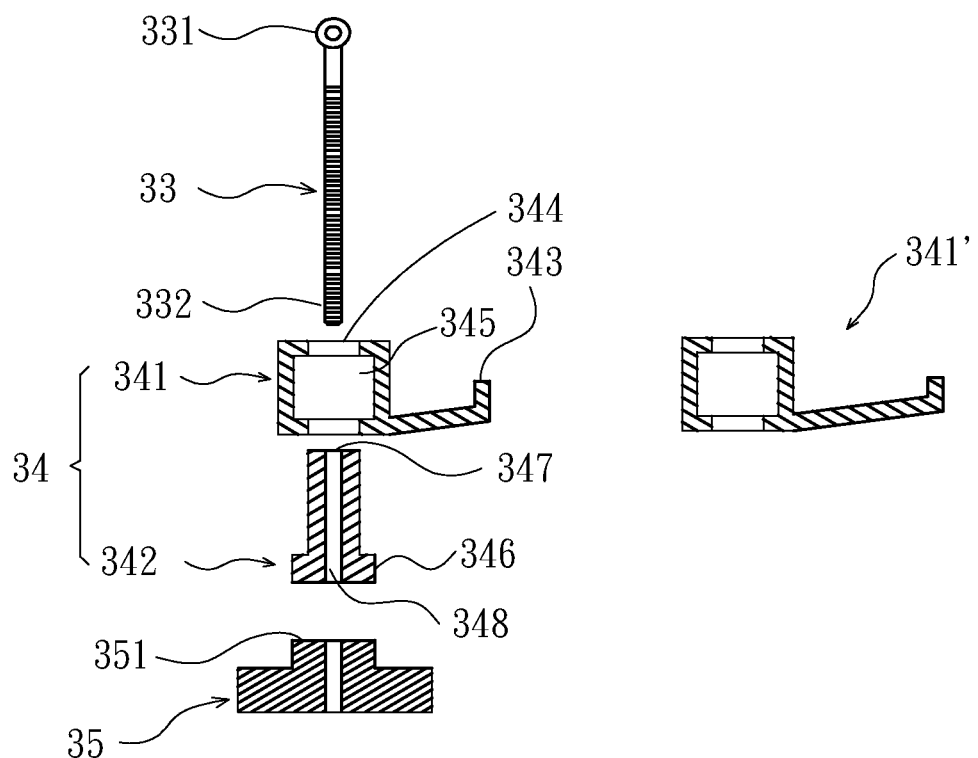
FIG. 3B is an exploded cross-sectional view of the clamp structure in FIG. 3.

Referring still to FIGS. 3 and 3B, in the first embodiment of the present invention, the clamp bolt 33 is preferably made of metal, such as stainless steel, iron, copper, aluminum or alloy thereof. The clamp bolt 33 has a pivotal end 331 and a thread end 332. The pivotal end 331 preferably has a pivotal hole which is inserted into the notch 323 and aligned with the stepped through hole 324, so that the pivotal element 325 can extend through the stepped through hole 324 and the pivotal end 331 to pivotally connect the clamp bolt 33 on the pivotal portion 322. Thus, the clamp bolt 33 can rotate in relation to the pivotal portion 322 along the notch 323. Similarly, the thread end 332 is the other end of the clamp bolt 33 opposite to the pivotal end 331, and used to screw-connect to the turning handle 35 which can be rotatable along the thread end 332. Thus, the actual position of the turning handle 35 on the thread end 332 can be adjusted during operation.

Referring now to FIGS. 3 and 3B, in the first embodiment of the present invention, the composite grip element 34 comprises a metal grip body 341 and a plastic sleeve 342, wherein the metal grip body 341 is made of rigid metal or alloy, such as aluminum or aluminum-based alloy; and the plastic sleeve 342 is made of plastic material, such as various engineering plastic, mainly including polyamide 6 (PA6), polyamide 66 (PA66), polypropylene (PP), acrylonitrile-butadiene-styrene (ABS) copolymer, polycarbonate (PC), polybutylene terephthalate (PBT) and etc. The metal grip body 341 is formed with an engaging portion 343, an installation hole 344 and a hollow portion 345, while the plastic sleeve 342 is formed with a first abutment flange 346, a second abutment end 347 and a passage 348. In installation, the plastic sleeve 342 passes through the installation hole 344 of the metal grip body 341, wherein the first abutment flange 346 of the plastic sleeve 342 is disposed a first outer side of the installation hole 344 of the metal grip body 341, while the second abutment end 347 of the plastic sleeve 342 is disposed a second outer side of the installation hole 344. The hollow portion 345 is transversely formed in the metal grip body 341 and communicated with the installation hole 344, and the plastic sleeve 342 actually passes through the installation hole 344 and the hollow portion 345, wherein the hollow portion 345 provides a certain slightly elastically deformable property to the metal grip body 341, so as to prevent from generating excess engagement force toward the flange surface 42 of the side wall 41 of the pick-up truck 4 to avoid the abrasion of the flange surface 42 and the engaging portion 343.

Figure 5:
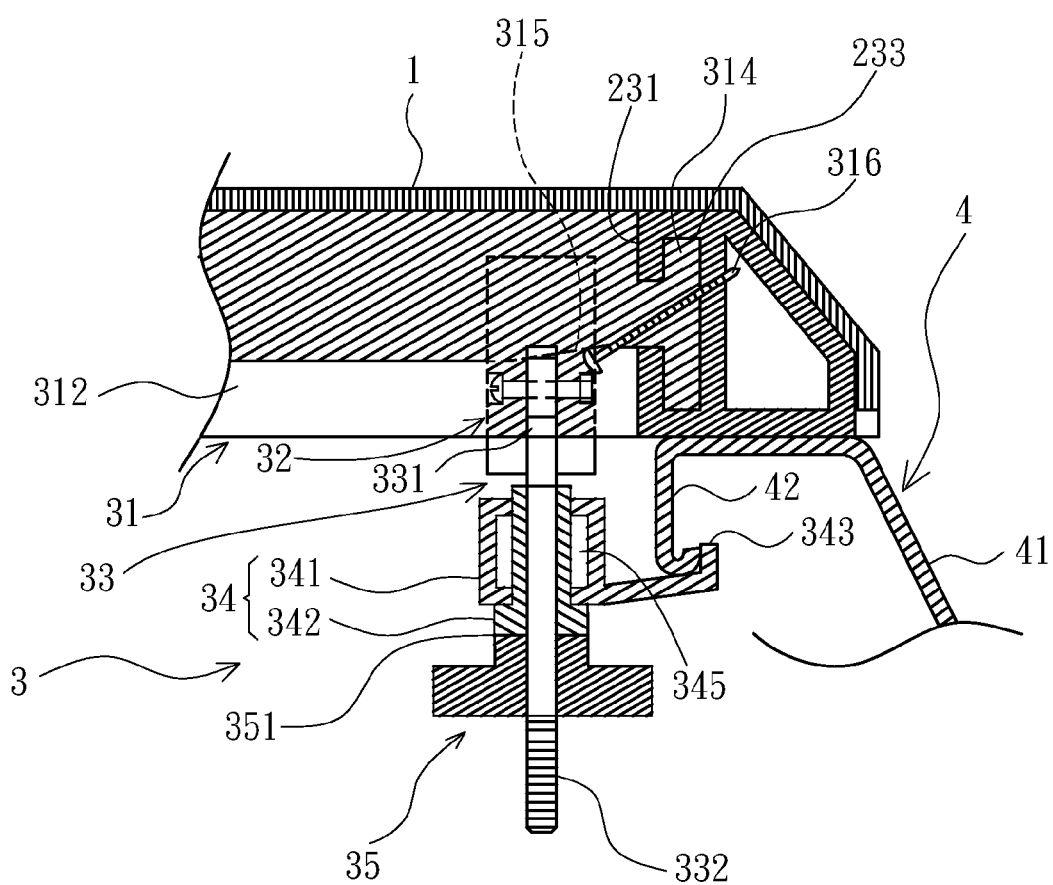
FIG. 5 is a side view of the clamp structure after clamping to the side wall of the pick-up truck according to the first embodiment of the present invention.

Furthermore, as shown in FIGS. 3 and 3B, the thread end 332 of the clamp bolt 33 can extend through the passage 348 of the plastic sleeve 342 of the composite grip element 34, so that the composite grip element 34 can be movably mounted on the thread end 332 of the clamp bolt 33. The first abutment flange 346 of the plastic sleeve 342 faces the turning handle 35, while the second abutment end 347 of the plastic sleeve 342 faces the sliding block 32. In the first embodiment of the present invention, the turning handle 35 is rotatably and movably screw-connected to the thread end 332 of the clamp bolt 33. The turning handle 35 has a push surface 351. When the turning handle 35 is manually turned, the push surface 351 can be moved up to smoothly abut against the first abutment flange 346 of the plastic sleeve 342 of the composite grip element 34, so as to control the engaging portion 343 of the thread end 332 of the composite grip element 34 to stably engage with a side wall 41 of the pick-up truck 4 (as shown in FIG. 5). Furthermore, during operation, the second abutment end 347 of the plastic sleeve 342 can be slight in contact with the surface of the sliding block 32 and smoothly slide across the sliding block 32, while the second abutment end 347 of the plastic sleeve 342 of the composite grip element 34 has a width greater than that of the notch 323 of the sliding block 32, and thus the second abutment end 347 can smoothly slide along a surface edge of the notch 323 of the sliding block 32. As a result, it can prevent the metal surface of the metal grip body 341 from being directly in contact with the surface of the sliding block 32 to cause harsh noise or surface abrasion.

Besides, as shown in FIG. 3B, if necessary, the composite grip element 34 has a backup metal grip body 341' having an engaging portion with a size different from that of the engaging portion 343 of the original metal grip body 341, and the metal grip body 341 can be replaced by the backup metal grip body 341'.

Referring now to FIGS. 4 and 5, in the first embodiment of the present invention, when the tonneau cover having three frame sections 21, 22, 23 is used in the extended position, the clamp structure 3 of the present invention, as shown in FIGS. 3 and 3B, can be used to lock the tonneau cover on the flange surface 42 of the side wall 41 of the cargo bed of the pick-up truck 4. Firstly, a user can manually hold the turning handle 35 to move the assembly of the sliding block 32, the clamp bolt 33, the composite grip element 34 and the turning handle 35, and thus the sliding block 32 will slide along an extended direction of the foundation rail 31, wherein each of the two side hangers 321 can be extended into each of the two side grooves 311 and slidably move along the two side grooves 311 without departing from the side grooves 311 due to the dovetailed shape of the side hangers 321 and the side grooves 311. During the sliding operation, the pivotal portion 322 of the sliding block 32 can be received in the recess 312 of the foundation rail 31 without contacting the inner surface of the recess 312. When the engaging portion 343 of the metal grip body 341 of the composite grip element 34 is moved to a locking position, the turning handle 35 can be manually turned in related to the thread end 332 of the clamp bolt 33, until the push surface 351 of the turning handle 35 abuts against the first abutment flange 346 of the plastic sleeve 342 of the composite grip element 34, so as to vertically move the engaging portion 343 of the metal grip body 341 to engage with the flange surface 42 of the side wall 41 of the pick-up truck 4, as shown in FIGS. 4 and 5.

Figure 6:
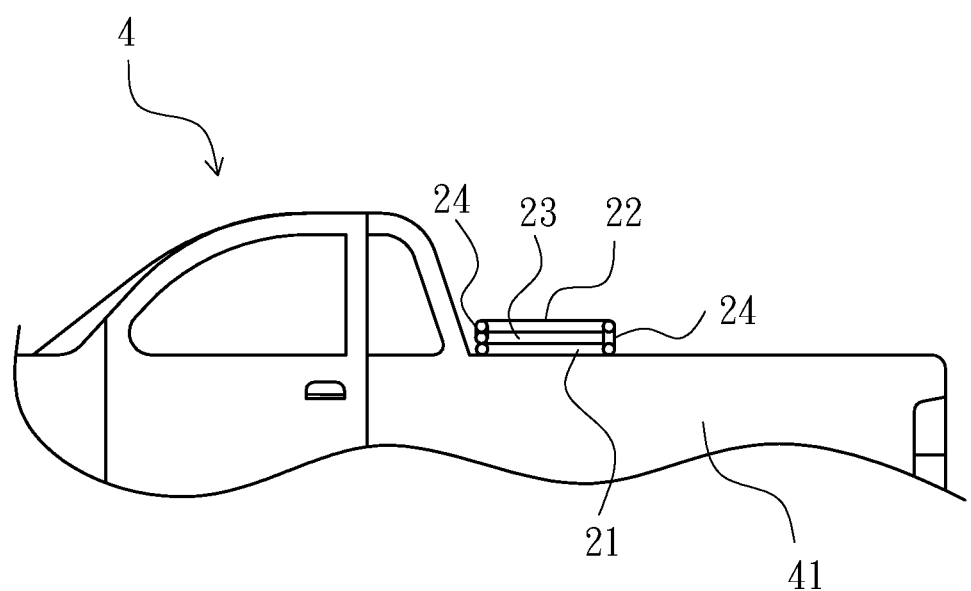
FIG. 6 is a schematic view of the tonneau cover in a storage position according to the first embodiment of the present invention.

Referring now to FIGS. 6 and 7, in the first embodiment of the present invention, when the tonneau cover is folded into a storage position (i.e. a closed position), the clamp structure 3 of the present invention, as shown in FIGS. 3 and 3B, can be shifted into its storage position under the tonneau cover. Firstly, a user can manually hold the turning handle 35 to move the assembly of the sliding block 32, the clamp bolt 33, the composite grip element 34 and the turning handle 35, and thus the sliding block 32 will slide along an extended direction of the foundation rail 31, until the notch 323 of the sliding block 32 is aligned with the indentation 313 of the foundation rail 31. Then, the clamp bolt 33 can be shifted into the notch 323 and the indentation 313 in relation to the pivotal end 331 thereof, so as to move the clamp structure 3 to the storage position. During the clamp bolt 33 is shifted, the second abutment end 347 can smoothly slide along the surface edge of the notch 323 of the sliding block 32 (or may not directly in contact therewith), so as to prevent the metal surface of the metal grip body 341 from being directly in contact with the surface of the sliding block 32 to cause harsh noise or surface abrasion. In the storage position, the turning handle 35 can be manually turned in relation to the thread end 332 of the clamp bolt 33, so that the push surface 351 of the turning handle 35 abuts against the first abutment flange 346 of the plastic sleeve 342 of the composite grip element 34 to vertically move the second abutment end 347 of the plastic sleeve 342 of the composite grip element 34 to engage with one side surface of the sliding block 32 (i.e. the surface edge of the notch 323). Therefore, the clamp structure 3 can be firmly positioned in the storage position without vibration, so as to ensure the operational reliability of the clamp structure 3.

As described above, the present invention provides a clamp structure 3 for a tonneau cover of the pick-up truck 4, wherein the clamp structure 3 has the composite grip element 34 which comprises the metal grip body 341 and the plastic sleeve 342, wherein the metal grip body 341 has the engaging portion 343 to stably engage with the flange surface 42 of the side wall 41 of the pick-up truck 4, and the plastic sleeve 342 has the first abutment flange 346 to smoothly abut against the turning handle 35 and the second abutment end 347 to smoothly slide on the sliding block 32. Thus, the composite grip element 34 can provide advantages of both of metal and plastic material, so that the operational stability and reliability of the clamp structure 3 can be enhanced, and the lifetime thereof can be elongated. Furthermore, the second abutment end 347 of the plastic sleeve 342 of the composite grip element 34 has a width greater than that of the notch 323 of the sliding block 32, and thus the second abutment end 347 of the plastic sleeve 342 smoothly slides along a surface edge of the notch 323 of the sliding block 32, so as to prevent the metal surface of the metal grip body 341 from being directly in contact with the surface of the sliding block 32 to cause harsh noise or surface abrasion.

Moreover, the hollow portion 345 of the metal grip body 341 is transversely formed in the metal grip body 341 and communicated with the installation hole 344, and the plastic sleeve 342 actually passes through the installation hole 344 and the hollow portion 345, wherein the hollow portion 345 provides a certain slightly elastically deformable property to the metal grip body 341, so as to prevent from generating excess engagement force toward the flange surface 42 of the side wall 41 of the pick-up truck 4 to avoid the abrasion of the flange surface 42 and the engaging portion 343. In addition, the original composite grip element 34 can be easily replaced by another backup composite grip element having a backup metal grip body 341' with a different specification, so that the clamp structure 3 can be rapidly changed and applied to a side wall of another pick-up truck with the different specification. Thus, the application flexibility of the clamp structure 3 can be expanded. Besides, the foundation rail 31 has a T-shape insertion block 314 to be movably inserted into an insertion groove 233 of the outer rail 231 of the third frame section 23, and the recess 312 of the foundation rail 31 has an inclined depression 315 close to the T-shape insertion block 314, wherein a screw 316 is received in the inclined depression 315 and passes through the T-shape insertion block 314 to screw-connect to an inner surface of the insertion groove 233 of the third frame section 23, so that a quick installation can be carried out.

Figure 8:
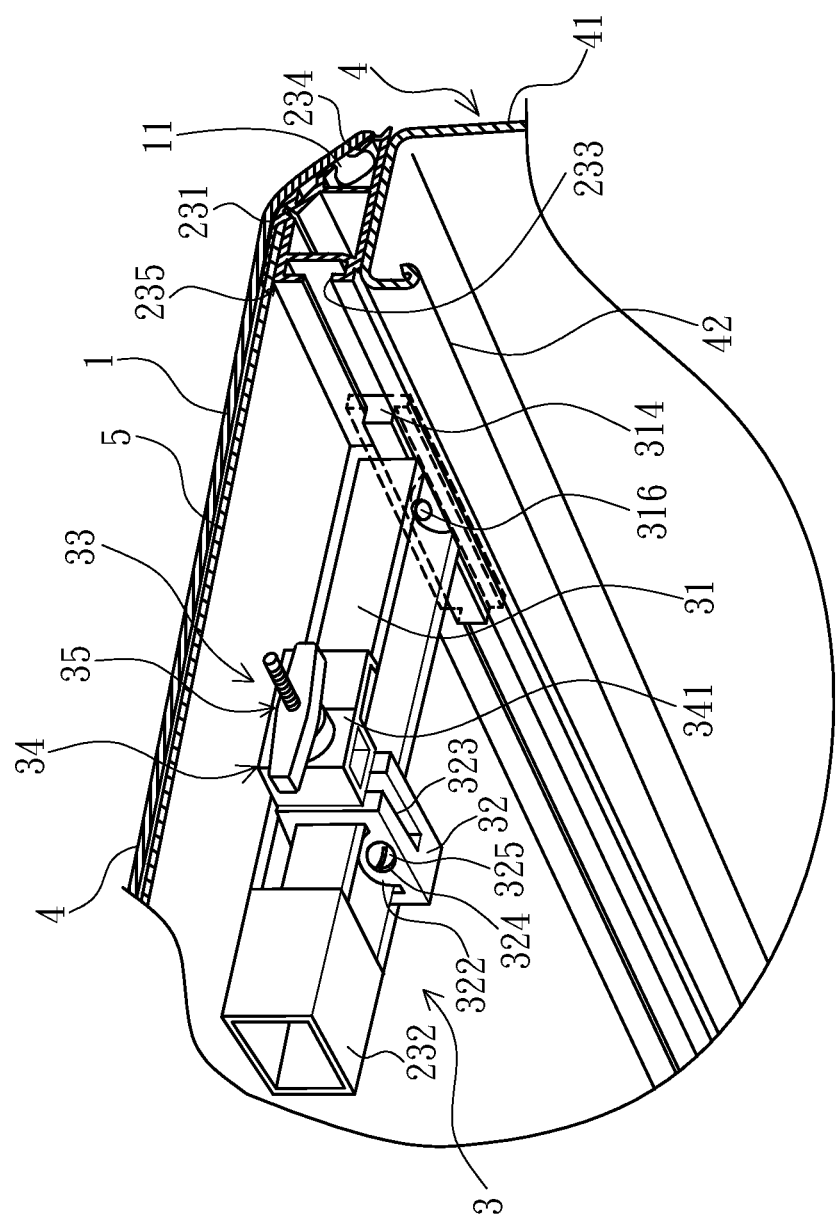
FIG. 8 is a perspective view of a composite tonneau cover of a pick-up truck according to a second embodiment of the present invention.
Figure 8A:
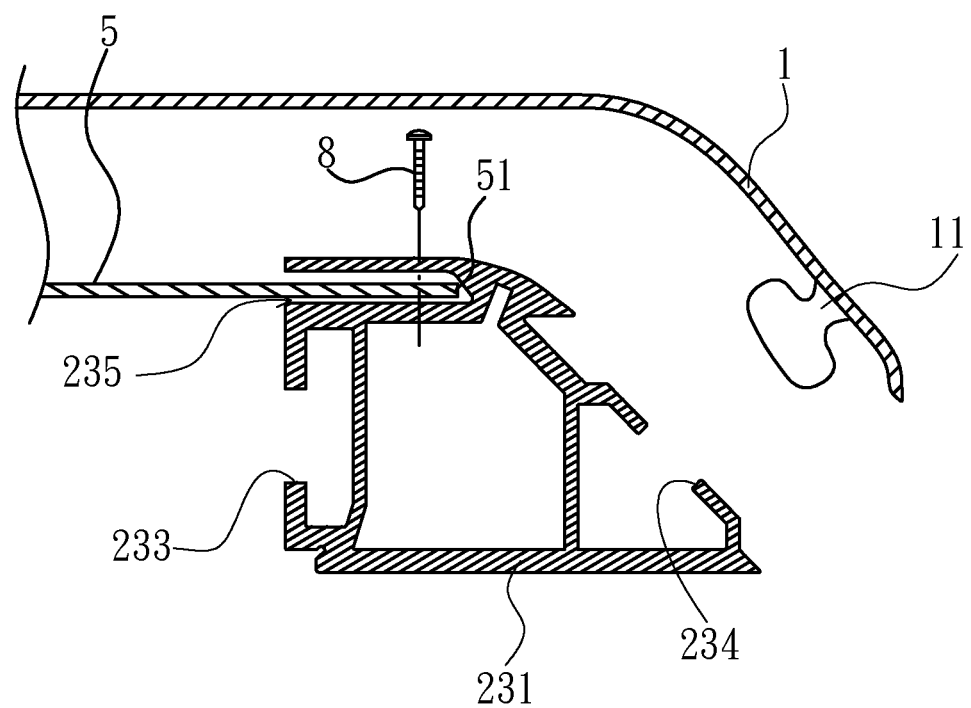
FIGS. 8A, 8B and 8C are is a partially cross-sectional views of the composite tonneau cover according to the second embodiment of the present invention.

Referring now to FIGS. 8 and 8A, a composite tonneau cover of a pick-up truck according to a second embodiment of the present invention is illustrated and similar to the first embodiment, so that the second embodiment uses similar terms or numerals of the first embodiment. As shown, in the second embodiment, the composite tonneau cover has at least one frame section, such as one, two, three, four or more. For example, the composite tonneau cover can have three frame sections 21, 22, 23, wherein each of the frame sections 21, 22, 23 comprises: a flexible cover material 1, a rigid metal panel 5, a plurality of outer rails 211, 221, 231, and at least one inner rail 212, 222, 232 (as shown in FIG. 2).

Referring to FIGS. 8 and 8A, in the second embodiment, the flexible cover material 1 is made of flexible material, such as canvas, vinyl plastic, or other weather-resistant fabric, but not limited thereto. The flexible cover material 1 is suitable fixed on the outer rails 211, 221, 231 of all of the frame sections 21, 22, 23, and can be simultaneously folded when the foldable frame 2 is folded, as shown in FIG. 2. The flexible cover material 1 has two or three end edges, and each of end edges of the flexible cover material 1 is formed with an insertion strip 11 made of rubber.

Figure 1:
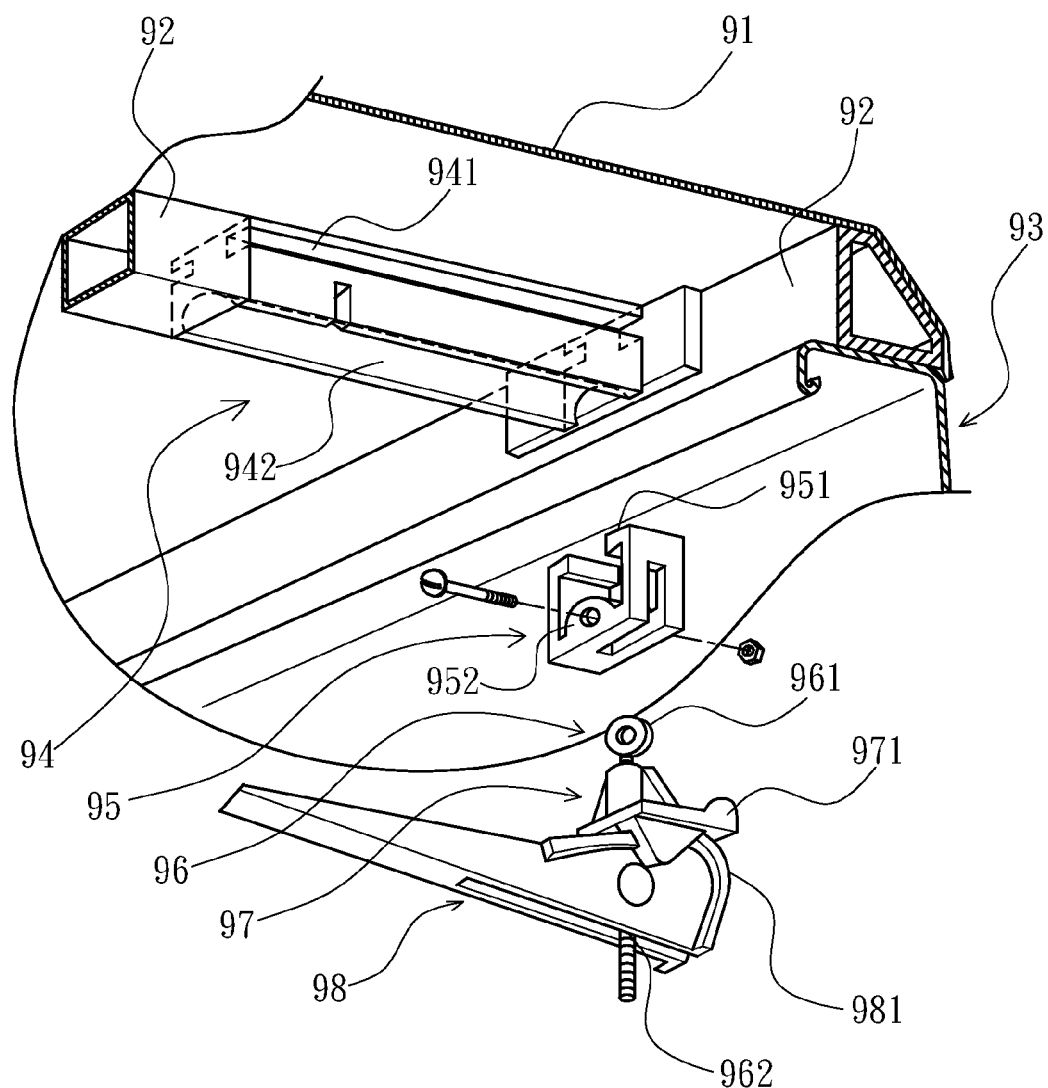
FIG. 1 is a partially enlarged view of a traditional clamp structure for the tonneau cover.
Figure 1A:
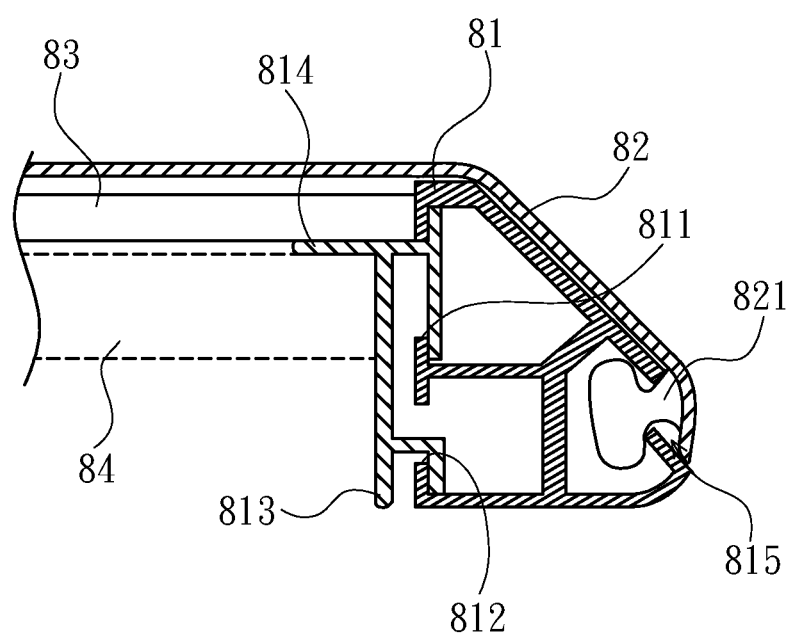
FIG. 1A is a partially cross-sectional view of another traditional tonneau cover.

Furthermore, referring to FIGS. 8 and 8A, in the second embodiment, the rigid metal panel 5 is made of rigid metal with suitable deformable property. For example, the rigid metal panel 5 is preferably an aluminum plate, but not limited thereto. The rigid metal panel 5 is covered by the flexible cover material 1 and has at least two end edges 51 opposite to each other. In other words, the rigid metal panel 5 is sandwiched between the flexible cover material 1 and the inner rail 231. In comparison with the traditional rigid plastic panel 83 of FIG. 1A, the rigid metal panel 5 can provide sufficient structural strength with smaller thickness and weight, and thus the entire thickness and weight of the tonneau cover can be reduced, the heat dissipation efficiency thereof can be enhanced, the crack risk of the rigid panel can be lowered.

Moreover, referring to FIGS. 8 and 8A, in the second embodiment, for each of the frame sections 21, 22, 23 (such as the frame section 23), the frame section 23 has two or three of the outer rails 231 and at least one inner rail 232, wherein the outer rails 231 define an outline of the frame section 23, and the inner rail 232 transversely spans in an interior defined by of the outer rails 231. Each of the outer rails 231 are a one-piece rail formed by aluminum extrusion and covered by the flexible cover material 1, wherein each of the outer rails 231 has an inner side formed with an C-shape insertion groove 233 and a linear installation groove 235, and further has an outer side formed with an C-shape engagement groove 234. Each of the inner rail 232 is also formed by aluminum extrusion. Because the outer rails 231 is one-piece element without other accessories (such as the traditional plastic support member 813 of FIG. 1A), the structure of the outer rails 231 of the present invention can be simplified, and the material cost can be lowered.

In installation, the insertion strip 11 of the flexible cover material 1 is inserted into the engagement groove 234 of each of the outer rails 231 to position the flexible cover material 1 onto the outer rails 231. Each of the end edges 51 of the rigid metal panel 5 is inserted into the installation groove 235 of one of the corresponding outer rails 231, wherein the end edges 51 of the rigid metal panel 5 can be further screw-connected to the installation groove 235 by screw members 8 to ensure the installation reliability. Each of two ends of the foundation rail 31 of the clamp structure 3 (as shown in FIG. 8) or the inner rail 222 (as shown in FIG. 2) is provided with a T-shape insertion block 314 to be movably (or stably) inserted into the insertion groove 233 of the outer rail. Thus, the installation reliability of the rigid panel can be increased, and the installation convenience can be improved.

Figure 8B:
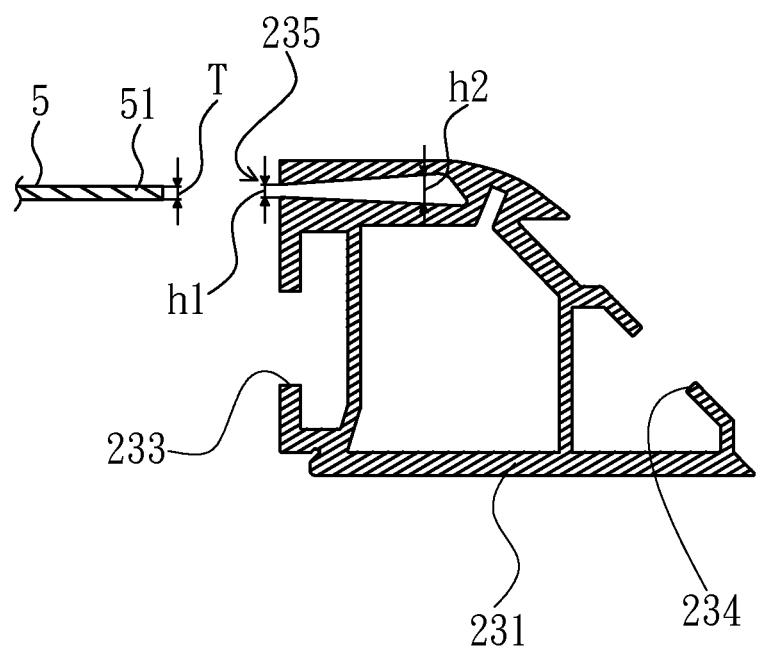

In alternative embodiment, referring to FIG. 8B, the installation groove 235 of the outer rail 231 has an opening portion and an inner portion, and the height (i.e. vertical width) h1 of the opening portion is slightly smaller than that of the inner portion (i.e. h2), for example, the height h1 of the opening portion can be slightly smaller than the thickness T of the rigid metal panel 5, while the height h2 of the inner portion is slightly greater than the thickness T of the rigid metal panel 5. Thus, the end edge 51 of the rigid metal panel 5 can be engaged with the opening portion and inserted into the inner portion of the installation groove 235 for ensuring the installation reliability.

Figure 8C:
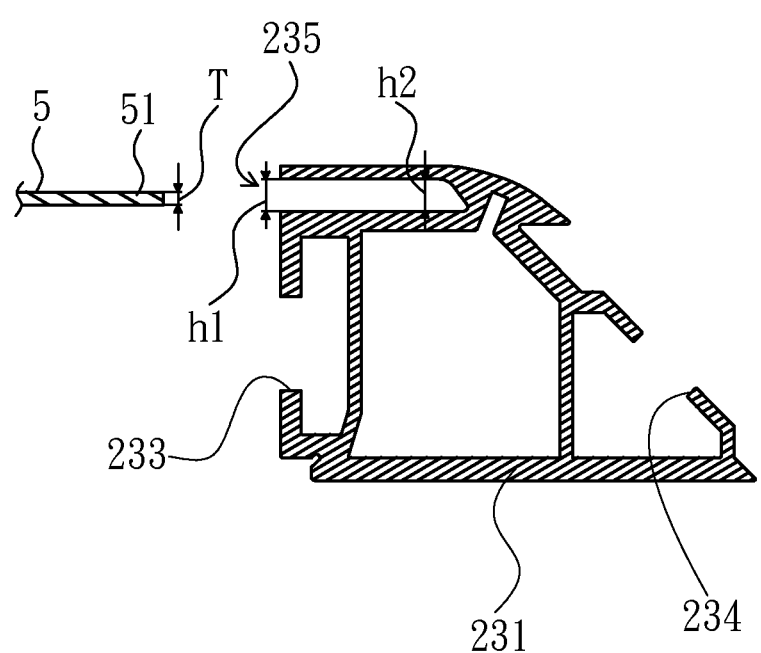

In another alternative embodiment, referring to FIG. 8C, the installation groove 235 of the outer rail 231 has an opening portion and an inner portion, and the height (i.e. vertical width) h1, h2 of the opening portion and the inner portion is slightly greater than the thickness T of the rigid metal panel 5. After the end edge 51 of the rigid metal panel 5 is inserted into the inner portion of the installation groove 235, the opening portion thereof is deformed by an external force to engage with the end edge 51 of the rigid metal panel 5 for ensuring the installation reliability.

Besides, each of the frame sections 231 is provided with a clamp 3 which is used to releasably secure the frame section 23 on a side wall 41 of a cargo bed of the pick-up truck 4, wherein the clamp 3 comprises the same structural of the clamp 3 in the first embodiment, and thus the detailed description of the clamp 3 is omitted hereinafter.

The present invention has been described with a preferred embodiment thereof and it is understood that many changes and modifications to the described embodiment can be carried out without departing from the scope and the spirit of the invention that is intended to be limited only by the appended claims.

The invention claimed is:

1. A composite tonneau cover of a pick-up truck, which has at least one frame section and is releasably secured on a side wall of a cargo bed of the pick-up truck, wherein each of the frame section comprises:
a flexible cover material;
a rigid metal panel covered by the flexible cover material and having at least two end edges; and
a plurality of outer rails covered by the flexible cover material, and each of the outer rails having an inner side formed with an installation groove;
wherein each of the end edges of the rigid metal panel is inserted into the installation groove of one of the outer rails, wherein
the frame section is provided with a clamp which is used to releasably secure the frame section on the side wall of the cargo bed of the pick-up truck, wherein the clamp comprises:
a foundation rail connected to the frame section, and having two side grooves formed on two side surfaces of the foundation rail, and a recess formed between the two side grooves;
a sliding block having two side hangers extended into the two side grooves and slidably moving along the two side grooves, and a pivotal portion received in the recess;
a clamp bolt having a pivotal end pivotally connected to the pivotal portion of the sliding block, and a thread end;
a composite grip element movably mounted on the clamp bolt, and having a metal grip body which is formed with an engaging portion and an installation hole and a plastic sleeve which passes through the installation hole of the metal grip body and is formed with a first abutment flange and a second abutment end facing on the sliding block; and
a turning handle rotatably and movably connected to the thread end of the clamp bolt, and having a push surface to smoothly abut against the first abutment flange of the plastic sleeve of the composite grip element, so as to control the engaging portion of the metal grip body of the composite grip element to stably engage with the side wall of the pick-up truck.

2. The composite tonneau cover according to claim 1, wherein the rigid metal panel is sandwiched between the flexible cover material and the inner rail, and the rigid metal panel is made of rigid metal with a deformable property.

3. The composite tonneau cover according to claim 2, wherein the rigid metal panel is an aluminum plate.

4. The composite tonneau cover according to claim 1, wherein the end edge of the rigid metal panel is screw-connected to the installation groove of the outer rail by screw members.

5. The composite tonneau cover according to claim 1, wherein the installation groove of the outer rail has an opening portion and an inner portion, and a height of the opening portion is slightly smaller than a height of the inner portion.

6. The composite tonneau cover according to claim 5, wherein the height of the opening portion is slightly smaller than a thickness of the rigid metal panel, and the height of the inner portion is slightly greater than the thickness of the rigid metal panel, so that the end edges of the rigid metal panel is engaged with the opening portion and inserted into the inner portion of the installation groove.

7. The composite tonneau cover according to claim 1, wherein the installation groove of the outer rail has an opening portion and an inner portion, and a height of the opening portion and the inner portion is slightly greater than a thickness of the rigid metal panel, wherein the opening portion is deformed to engage with the end edge of the rigid metal panel after the end edge of the rigid metal panel is inserted into the inner portion of the installation groove.

8. The composite tonneau cover according to claim 1, wherein the inner side of the outer rail is formed with a C-shape insertion groove under the installation groove.

9. The composite tonneau cover according to claim 8, wherein the frame section has two or three of the outer rails and at least one inner rail, wherein the outer rails define an outline of the frame section, and the inner rail spans in an interior defined by the outer rails.

10. The composite tonneau cover according to claim 9, wherein each of two ends of the inner rail has a T-shape insertion block to be movably inserted into the C-shape insertion groove of the outer rail.

11. The composite tonneau cover according to claim 1, wherein the flexible cover material is made of weather-resistant fabric, the flexible cover material has two or three end edges, and each of end edges of the flexible cover material is formed with an insertion strip made of rubber.

12. The composite tonneau cover according to claim 11, wherein the outer rail has an outer side formed with a C-shape engagement groove, and the insertion strip of the flexible cover material is inserted into the C-shape engagement groove of the outer rail.

13. The composite tonneau cover according to claim 1, wherein the sliding block further comprises a notch which is extended from a lower surface of the sliding block to one side surface thereof, and the clamp bolt can be shifted into the notch to move to a storage position.

14. The composite tonneau cover according to claim 13, wherein the second abutment end of the plastic sleeve of the composite grip element has a width greater than that of the notch of the sliding block, and thus the second abutment end of the plastic sleeve smoothly slides along a surface edge of the notch of the sliding block.

15. The composite tonneau cover according to claim 13, wherein one of the side surfaces of the foundation rail further comprises an indentation which is communicated with the recess, and the clamp bolt can be shifted into the indentation to move to the storage position.

16. The composite tonneau cover according to claim 15, wherein the notch of the sliding block is aligned with the indentation of the foundation rail when the composite tonneau cover is in the storage position; and the pivotal portion of the sliding block is received in the recess of the foundation rail without contacting an inner surface of the recess.

17. The composite tonneau cover according to claim 1, wherein the metal grip body has a hollow portion transversely communicated with the installation hole, and the plastic sleeve passes through the installation hole and the hollow portion.

18. The composite tonneau cover according to claim 1, wherein the composite grip element has a backup metal grip body having an engaging portion with a size different from that of the engaging portion of the metal grip body, and the metal grip body can be replaced by the backup metal grip body.

19. The composite tonneau cover according to claim 1, wherein the foundation rail is connected to the outer rail of one of the frame sections and has a T-shape insertion block to be movably inserted into a C-shape insertion groove formed on the inner side of the outer rail; and the recess of the foundation rail has an inclined depression close to the T-shape insertion block, wherein a screw is received in the inclined depression and passes through the T-shape insertion block to screw-connect to an inner surface of the C-shape insertion groove of the outer rail.

* * * * *